US 6,268,428 B1

(12) United States Patent
Okita et al.

(10) Patent No.: US 6,268,428 B1
(45) Date of Patent: Jul. 31, 2001

(54) KNEADED RUBBER FOR EXPANDABLE FORMULATION

(75) Inventors: Tomoaki Okita, Kasugai; Katsumi Nakashima, Ichinomiya; Hidenari Nakahama, Ichihara, all of (JP)

(73) Assignee: Toyoda Gosei Co., Ltd., Aichi-Ken (JP)

( * ) Notice: Subject to any disclaimer, the term of this patent is extended or adjusted under 35 U.S.C. 154(b) by 0 days.

(21) Appl. No.: 09/353,660

(22) Filed: Jul. 15, 1999

(30) Foreign Application Priority Data

Jul. 28, 1998 (JP) .................................................. 10-213211

(51) Int. Cl.⁷ ................................. C08L 23/16; C08J 9/00
(52) U.S. Cl. ........................ 524/515; 524/525; 524/526; 524/543; 525/191; 525/232; 525/240
(58) Field of Search ..................................... 524/515, 525, 524/526, 543; 525/191, 232, 240

(56) References Cited

U.S. PATENT DOCUMENTS 4,818,785 * 4/1989 Otawa et al. ......................... 524/576

FOREIGN PATENT DOCUMENTS 10-195227  7/1998 (JP) .
97/02316   1/1997 (WO) .

* cited by examiner

Primary Examiner—Nathan M. Nutter
(74) Attorney, Agent, or Firm—Pillsbury Winthrop LLP

(57) ABSTRACT

A kneaded rubber for expandable formulation, such as a material for die forming. The polymer components in the kneaded rubber principally comprise a polymer alloy, further comprising a sea phase of a ethylene/α-olefin/non-olefin/non-conjugated polyene terpolymer rubber and an island phase of a polyolefin resin. The polyolefin resin wholly or largely comprises a monomer $C_4$–$C_6$ α-olefin and has an MFR of at least 15 g/10 min at 190° C. under a load of 2.196 kgf according to ASTMD 1238. The kneaded rubber satisfies the following Mooney viscosity profile formula according to JIS K 6300:

$$(ML_{1+4} 80° C.) - (ML_{1+4} 160° C.) \geq 15.$$

11 Claims, 1 Drawing Sheet

KNEADED RUBBER FOR EXPANDABLE FORMULATION

BACKGROUND OF THE INVENTION

1. Field of the Invention

The present invention relates to a non-vulcanized, kneaded rubber designed for expandable formulation uses. More specifically, the invention relates to a kneaded rubber suitable for die forming sponge parts, principally comprising continuous foam, to be used, for example, for producing door roof weather strips.

The kneaded rubber material for expandable formulation, according to the present invention, is applicable not only as die forming and sponge rubber material, but also as an extrusion molding material and a material for producing foam rubber products principally comprising closed-cell foam.

2. Description of the Related Art

A door weather strip will now be taken as an example for purposes of explanation. Sealability and a soft touch when opening and closing are demanded for door weather strips and the like. Therefore, at least the part of the strip facing the door should be formed of a sponge rubber with a low rebound elasticity.

The main parts of weather strips are extrusion molded, while the corner and end parts thereof are die formed using injection and transfer molding techniques. The sponge rubber comprises a low-viscosity blend, that is highly fluid at high temperatures so that the rubber can retain fluidity in dies for die forming and injection fluidity for injection molding.

Meanwhile, kneaded rubbers for expandable formulation, as prepared with kneaders such as the Banbury mixer and kneading rollers, are at a relatively low viscosity. These rubbers are generally stored so that the rubbers are folded together in a form of continuous sheet or continuous tape. Therefore, the rubbers are adhesive with a small kneaded rubber viscosity (green strength).

The following problems occur regarding the handling of the resulting kneaded rubbers after termination of the kneading procedures:

(1) After the termination of the kneading procedures, the resulting kneaded rubbers readily adhere to and remain on kneading rollers, involving a large variation in the material weight per unit area, when the kneaded rubbers are cut out in a sheet shape or in a tape shape from the kneading rollers. The kneaded rubbers readily remain on the rotors of the Banbury mixer, and thereby contaminate a subsequent batch with extraneous materials.

(2) Adhesion preventives, such as talc and surfactants do not function satisfactorily to permit storing the resulting kneaded rubbers in a folded shape. Therefore, these rubbers should be immersed in a water tank for storage. More specifically, a large volume of adhesion preventives causes die contamination (in both transfer and injection molding) and thus induces potential connection failure between the die-formed part and the main extrusion formed part of weather strip. Furthermore, kneaded rubbers storage in water, absorb water, leading to a frequent incidence of variation in the expansion ratio.

(3) Materials designed for single transfer molding, so-called ball materials, adhere together, leading to frequent occurrence of variation in the ball material weight when the ball materials are prepared by cutting.

(4) Due to the low green strength, the rubbers cannot be fed sufficiently into the feed rollers of material loaders, such as injection molding machines or extruders, so that molding failures readily occur due to poor loading of the materials.

SUMMARY OF THE INVENTION

It is an object of the invention to provide a kneaded rubber for an expandable formulation, with the rubber exhibiting excellent fluidity during molding and good handling (drawing out of rolls, storage, ball material preparation, and material loading into molding machines) after termination of kneading.

The present inventors have attained the object by an expandable kneaded rubber comprised of a polymer alloy base, comprised of a sea phase of an ethylene/$\alpha$-olefin/non-conjugated polyene terpolymer rubber and an island phase of a polyolefin resin, where the polyolefin resin wholly or primarily comprises a monomer $C_4$–$C_6$ $\alpha$-olefin and is at an MFR (Melt Flow Rate) of 15 g/10 min or more at 190° C. under a load of 2.196 kgf according to ASTM D 1238 and the kneaded rubber exerts a Mooney viscosity profile characterized according to JIS K 6300, according to the following equation:

$$(ML_{1+4} 80°\ C.) - (ML_{1+4} 160°\ C.) \geq 15.$$

Preferably, the kneaded rubber satisfies the following Mooney viscosity profile formula:

$$(ML_{1+4} 80°\ C.) - (ML_{1+4} 160°\ C.) \geq 30.$$

The kneaded rubber for expandable formulation can be readily produced by preparing the morphology, in the aggregated form, of the island phase in a non-spherical shape. The polyolefin resin comprising the island phase is preferably crystallizable. The kneaded rubber according to the invention is produced by softening or melting the polyolefin to prepare the above morphology of the island phase in a non-spherical shape during kneading.

As demonstrated in the following examples, the kneaded rubber for expandable formulation according to the invention achieves an increased green strength while the rubber retains fluidity allowing it to act as a molding material.

SUBSTITUTE SPECIFICATION

Therefore, the conventional handling problems of kneaded rubbers are overcome. More specifically, the kneaded rubber for expandable formulation according to this invention works well as it is excellent from the standpoint of kneaded rubber handling, drawn out of rolls, held in storage, used for ball material preparation, and as it is loaded into molding machines. The Mooney viscosity profile is shown graphically, together with those of conventional kneaded rubbers, are shown in FIG. 2.

BRIEF DESCRIPTION OF DRAWINGS

The accompanying drawings illustrate preferred embodiments of the present invention in which.

DETAILED DESCRIPTION OF THE INVENTION

Figure 1:
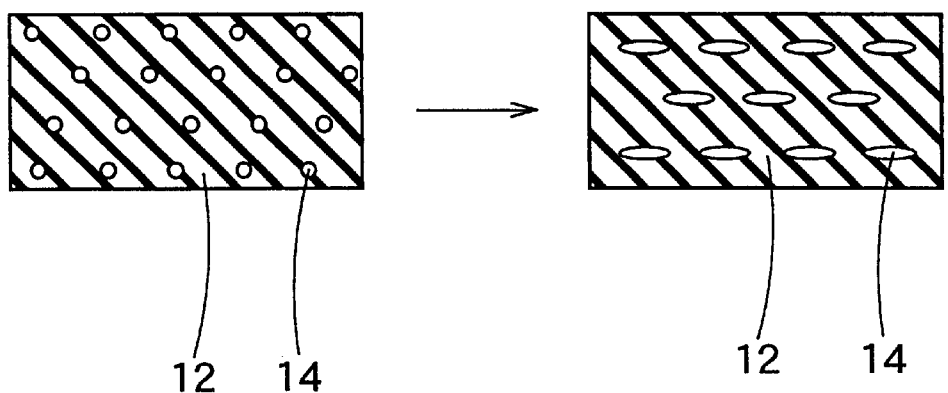
FIG. 1 depicts schematic cross sectional views of the kneaded rubber according to the invention prior to and after kneading.
Figure 2:
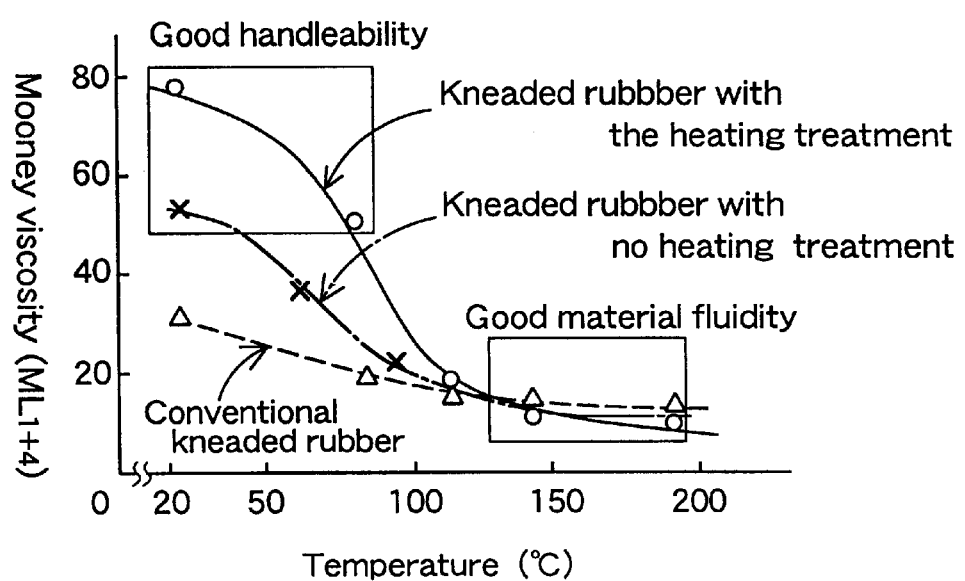
FIG. 2 depicts the Mooney viscosity profiles of the examples of the invention, kneaded under heating, without heating, and conventionally kneaded rubbers.

The invention is described in the following preferred embodiments of the invention. The term "part(s)", expressing a blended part, means "part(s) by weight", unless otherwise stated. The kneaded rubber of the invention comprises a polymer alloy base further comprising a sea phase (12) of ethylene/α-olefin/non-conjugated polyene terpolymer rubber (EOR) and an island phase (14) of polyolefin resin (see FIG. 1).

Suitable α-olefins include α-olefins having 3 to 6 carbon atoms, such as propylene, 1-butene, 1-pentene, 4-methylpentene, 1-hexene and a mixture thereof, preferably propylene.

The molar ratio of ethylene to the a-olefin ranges between about 60/40 and 80/20, and preferably from about 63/37 to 77/23, more preferably from about 65/35 to 75/25. Excessive ethylene increases the resin properties of EOR, while with too little ethylene, EOR gives inadequate strength.

Furthermore, the non-conjugated polyene (isolated polyene) in EOR includes cyclic dienes, such as 5-ethylidene-2-norbornene (ENB), dicyclopentadiene (DCP), 5-vinyl-2-norbornene, norbomadiene, methyltetrahydroindene, chain dienes such as 1,4-hexadiene and 7-methyl-1,6-octadiene, chain trienes such as 8-methyl-4-ethylidene-1,7-nonadiene and 4-ethylidene-1,7-undecadiene, and a mixture thereof.

The non-conjugated diene is copolymerized at an amount of about 10 to 50, preferably about 15 to 40, and more preferably about 20 to 30, on the basis of the iodine value expression. Generally, EOR has a molecular weight such that the Mooney viscosity ($ML_{1+4}$ 100° C.) of about 20 to 50, preferably 25 to 45, as measured according to JIS K 6300 is achieved.

Auxiliary materials are blended in the kneaded rubber including, for example, carbon black, zinc oxide, process oil, stearic acid, an aging preventive and/or an inorganic filler (excluding carbon black), and mixtures thereof. Suitable carbon black includes, for example, highly structured SRF grades (of types with high oil absorptivity), so that a large green strength can be readily procured. The inorganic filler includes, for example, silica, ground calcium carbonate, talc, and/or clay.

The first characteristic of the above composition is that it primarily comprises a polyolefinic polymer resin wholly or principally comprising a monomer $C_4$–$C_6$ α-olefin having an MRF (Melt Flow Rate) of 15 g/10 min or more, preferably 20 g /10 min or more at 190° C. under a load of 2.196 kgf according to ASTM D 1238. The $C_4$–$C_6$ α-olefin includes those described above, preferably 1-butene. The MFR of poly-1-butene is generally about 15 to 100 g/10 min.

With respect to the polyolefin resin, a homopolymer of 1-butene or block or random copolymers of 1-butene, such as 1-butene/ethylene copolymer or 1-butene/ propylene copolymer at a 1-butene content of 90 mol % or more is preferred. The polyolefin resin may be either crystallizable or non-crystallizable. A crystallizable polyolefin resin with a crystallization degree of 20% or more is preferable, because the aggregated morphology of the island phase can thereby be readily prepared in an oriented non-spherical shape.

A small value for MFR does not give a molded product with sufficient hardness and strength properties, which may be imparted through the action of the polyolefin resin in the kneaded rubber. The polyolefin resin is blended therein, generally at about 10 to 35 parts by weight, preferably about 15 to 30 parts by weight.

The second characteristic of the invention is that the kneaded rubber satisfies the following Mooney viscosity profile formula:

$$(ML_{1+4}\ 80°\ C.)-(ML_{1+4}\ 160°\ C.) \geq 15.$$

The kneaded rubber with such a viscosity profile can be easily handled at relatively low temperatures (about 25° C. to 100° C.). When differences in the viscosity between high temperatures (around the vulcanization temperature) and low temperatures (around the maximum temperature for handling the kneaded rubber) is less than 15, the resulting kneaded rubber exhibits effects not so different from those of conventional kneaded rubbers.

More preferably, the inventive kneaded rubber should satisfy the following Mooney viscosity profile formula:

$$(ML_{1+4}\ 80°\ C.)-(ML_{1+4}\ 160°\ C.) \geq 30.$$

The Mooney viscosity profile can readily be procured by a kneading process comprising softening or melting the polyolefin resin to prepare the morphology, in an aggregated form, into the island phase (14) with a non-spherical shape (in orientation) (see FIG. 1).

During the kneading process, the polyolefin resin is softened at the softening temperature or higher or is brought into a melted state at or above the melting point. The resulting resin is then oriented through kneading and brought below the softening temperature so that the morphology of the island phase turns non-spherical, i.e., plate-like (double fibril-like) or single fibril-like.

For example, when the polyolefin resin is 1-polybutene (semi-crystalline resin), it is satisfactorily kneaded together at an initial temperature which is such that the temperature of 1-polybutene exceeds 124° C. (the softening point thereof is about 124 to 130° C. as measured according to ASTM D 1238). In other words, it is satisfactory that the inner temperature be above 124° C. throughout kneading (due to inner friction heat), even if the control temperature (surface temperature of the kneaded rubber) is 124 ° C. or lower.

For orientation procurement, namely for satisfaction of the Mooney viscosity profile formula [($ML_{1°4}$ 80° C.)–($ML_{1+4}$ 160° C.)$\geq$30], the polyolefin resin is kneaded together above 130° C. (the maximum allowable temperature being below 150° C., preferably 140° C., in light of the kneadability) for about 2 to 10 minutes. In the case where satisfaction of the Mooney viscosity profile formula [($ML_{1+4}$ 80° C.)–($ML_{1+4}$ 160° C.)$\geq$15] is sufficient, 1-polybutene is heated at or just below the softening temperature and oriented to some extent with no need of thorough orientation. Therefore, in that case, the resin is kneaded together at a temperature of about 110° C. or higher, preferably about 120 to 130° C., for about 2 to 10 minutes.

In the latter case, during the summer season, it is generally not required to heat 1-polybutene, because the frictional heat during rubber kneading elevates the temperature. Even during the summer season, generally, it is nevertheless required in the former case, where the above Mooney viscosity profile formula is sufficient, to preheat the raw material rubber to about 60° C. or to heat the mixer to be used to an appropriate temperature because kneading does not elevate the temperature above 130° C.

When kneading by means of scaled-type kneaders, such as a Banbury mixer, is terminated, the resulting kneaded rubber is cooled down and an expanding agent and agents for vulcanization are subsequently added, followed by final kneading at a temperature of, for example, below about 80° C., by means of, for example, an oven roller.

Suitable expanding agents include those which are decomposable at the vulcanization temperature. They are used in combination with auxiliary expanding agents, including the inorganic or organic expanding agents given below.

The inorganic expanding agents include, for example, sodium hydrogen carbonate, sodium carbonate, ammonium hydrogen carbonate, ammonium carbonate and ammonium nitrite.

The organic expanding agents include, for example, azodicarboamide (azobisformamide) (ADCA), azobisisobutyro-nitirile, azodicyclohexylnitrile, N,N'-dimethyl-N,N'-dinitroso-telephthalamide, N,N'-dinitrosopentamethylene-tetramine, azodiaminobenzene, barium azodicarboxylate, benzenesulfonyl hydrazide, toluenesulfonyl hydrazide, 4,4'-oxybis(benzene-sulfonyl hydrazide), diphenylsulfone-3,3-disulfonyl hydrazide, calcium azide, 4,4-diphenyldisulfonyl azide, and p-tolueneformanyl azide.

Preferably, the organic expanding agent is ADCA to which is preliminarily added the auxiliary expanding agent (for example, urea or zinc compounds), which is then adjusted to a decomposition temperature of about 120 to 170° C. for the formation of the sponge part of a weather strip. An expanding agent combined at an amount of about 4 to 16 phr with the auxiliary expanding agent at an amount of about 0.2 to 3.0 parts per 10 parts of the expanding agent is preferred.

Additionally, the agents for the vulcanizing process include, for example, vulcanization agents, vulcanization-promoting agents, auxiliary vulcanization agents and scorching preventives.

The vulcanizating processes for the kneaded rubber of this invention generally include sulfur vulcanizating processes or organic peroxide vulcanizating processes.

Additionally, for the sulfur vulcanizating processes, vulcanization-promoting agents are used in combination with sulfur.

Preferably, the vulcanization-promoting agents of the present invention include a combination of at least one agent selected from the following three groups: (1) thiazoles, such as N-cyclohexyl-2-benzothiazole sulfonamide, N-oxydiethylene-2-benzothiazole sulfonamide, N,N-diisopropyl-2-benzothiazole sulfonamide, 2-mercaptobenzothiazole, 2-(2,4-dinitro-phenyl)mercapto-benzothiazole, -(2,6-diethyl-4-morpholino-thio) benzothiazole and dibenzothiazyldisulfide; (2) dithiocarbamates, such as zinc dibutyldithiocarbamate, zinc dimethyldithiocarbamate, and zinc N-ethyl-N-phenyldithiocarbamate; and (3) thiurames such as tetramethylthiuram disulfide, tetrakis(2-ethylhexyl) thiuram disulfide, and tetramethylthiuram disulfide.

Preferably, these vulcanization-promoting agents are blended at a ratio (in parts) of thiazoles/dithiocarbamates/thiuram=8/4/4 to 3/2/1, per 4 parts of sulfur.

For the organic peroxide vulcanizating processes, furthermore, auxiliary vulcanization agents are generally used in combination with an organic peroxide. Suitable organic peroxides include dicumyl peroxide, di-t-butyl peroxide, and di-t-butyl peroxy-3,3,5-trimethylcyclohexane, and a mixture thereof.

As the auxiliary vulcanization agents, additionally, triallyl isocyanurate and triallyl cyanurate are preferably used. The auxiliary vulcanization agents are blended at a ratio of 0.25 to one part, per one part of the organic peroxide.

EXAMPLES

The following non-limiting examples and comparative examples, together with the results of tests to verify the advantages of this invention, are given as particular embodiments of the invention and to demonstrate the practice and advantages thereof.

1. Preparation of Kneaded Rubbers

Rubber blends with individual blend formulations, shown in Table 1, were separately loaded into a 1.75-liter Banbury mixer. The blends were retained at a temperature of 40° C. After the temperature of the kneaded blends reached 125° C., the blends were continually kneaded together for another 5 minutes. The blends were then drawn out of the Banbury mixer and designated as kneaded rubbers with no heating treatment.

The same rubber blends were treated in the same manner as described above, except that the Banbury mixer was heated from the outside. After the temperature of the kneaded blends reached 135° C., the blends were continually kneaded together for another 5 minutes. The blends were then drawn out of the Banbury mixer and were designated as kneaded rubbers with heating treatment.

The Mooney viscosities ($ML_{1+4}$ 80° C. and $ML_{1+4}$ 160° C.) of the sample rubbers with no heating treatment and the sample rubbers with the heating treatment were then measured. In addition, the green strengths of the sample rubbers with no heating treatment and the sample rubbers with the heating treatment were measured by the following test method.

Test Method

A test piece of JIS dumbbell No. 1 shape is punched out of a non-vulcanized rubber sheet at a 2 mm thickness in parallel to the roll sheet discharge direction. Following JIS K 6301, the test piece is elongated by means of an autograph, and its peak strength is then measured.

The test results are shown in Table 1, indicating that the kneaded rubbers of the Examples have larger green strengths than those of the kneaded rubbers of the Comparative Examples. Clearly, the sample rubbers with the heating treatment have far larger green strengths.

TABLE 1

|  | Examples | | | | Comparative Examples | | | |
|---|---|---|---|---|---|---|---|---|
| Polyolefin resin*1 | 20 | 20 | 20 | 20 | — | — | — | — |
| EPDM*2 | — | — | — | — | — | 70 | — | 70 |
| EPDM*3 | 100 | 100 | 100 | 70 | 70 | — | 100 | — |
| EPDM *4 | — | — | — | 30 | 30 | 30 | — | 30 |
| C/B SRF-HS | 80 | 70 | 70 | 70 | 90 | 90 | 90 | 70 |
| Oil | 80 | 80 | 70 | 70 | 70 | 70 | 70 | 50 |
| Zinc oxide | 5 | 5 | 5 | 5 | 5 | 5 | 5 | 5 |
| Stearic acid | 1 | 1 | 1 | 1 | 1 | 1 | 1 | 1 |
| Kneaded rubbers with no heating treatment | | | | | | | | |
| $ML_{1+4}$ 80° C. | 49 | 28 | 40 | 40 | 23 | 16 | 20 | 20 |
| $ML_{1+4}$ 160° C. | 9 | 6 | 8 | 3 | 14 | 4 | 12 | 7 |
| viscosity difference | 40 | 22 | 32 | 37 | 9 | 12 | 8 | 13 |
| green strength | 392 | 188 | 280 | 278 | 80 | 69 | 78 | 94 |
| Kneaded rubbers with the heating treatment | | | | | | | | |
| $ML_{1+4}$ 80° C. | 68 | 43 | 45 | 60 | 26 | 17 | 22 | 20 |
| $ML_{1+4}$ 160° C. | 10 | 6 | 8 | 4 | 12 | 4 | 11 | 6 |
| Viscosity difference | 58 | 37 | 37 | 56 | 14 | 13 | 11 | 14 |
| green strength | 406 | 209 | 294 | 295 | 78 | 68 | 76 | 93 |

*1: 1-polybutene at crystallization degree of 20% and MFR of 22 g/10 min at 190° C.
*2: ethylene content of 56 wt %, iodine value of 26 and Mooney viscosity ($ML_{1+4}$ 100° C.) of 25, containing a third component ENB.
*3: ethylene content of 54 wt %, iodine value of 27 and Mooney viscosity ($ML_{1+4}$ 100° C.) of 45, containing a third component ENB.
*4: ethylene content of 65 wt %, iodine value of 24 and Mooney viscosity ($ML_{1+4}$ 100° C.) of 9, containing a third component ENB.

What is claimed is:
1. A kneaded rubber expandable formulation, comprising a polymer alloy, that comprises a sea phase of an ethylene/

α-olefin/non-conjugated polyene terpolymer rubber and an island phase of a polyolefin resin, wherein said polyolefin resin is wholly or partially composed of a monomer $C_4$–$C_6$ α-olefin and has an MFR of about 15 g/10 min at 190° C. under a load of 2.196 kgf according to ASTM D 1238, and wherein said kneaded rubber has a viscosity the following Mooney viscosity profile according to a JIS K 6300 testing protocol:

$(ML_{1+4}\ 80°\ C.) - (ML_{1+4}\ 160°\ C.) \geq 15.$

2. The kneaded rubber according to claim 1, wherein said kneaded rubber satisfies the following Mooney viscosity profile formula:

$(ML_{1+4}\ 80°\ C.) - (ML_{1+4}\ 160°\ C.) \geq 30.$

3. The kneaded rubber according to claim 2, wherein the aggregated morphology of the island phase is in an oriented non-spherical shape.

4. The kneaded rubber according to claim 3, wherein the polyolefin is a crystallizable polyolefin resin.

5. The kneaded rubber according to claim 1, wherein the aggregated morphology of the island phase is in an oriented non-spherical shape.

6. The kneaded rubber according to claim 5, wherein said polyolefin is a crystallizable polyolefin resin.

7. A method for producing a rubber expandable formulation, comprising the steps of:

softening the polyolefin resin to prepare the aggregated morphology of the island phase in an oriented non-spherical shape so that the rubber produced satisfies the following Mooney viscosity profile according to a JIS K 6300 testing protocol:

$(ML_{1+4}\ 80°\ C.) - (ML_{1+4}\ 160°\ C.) \geq 15.$

8. The method for producing a rubber according to claim 7, wherein the step of softening is accomplished by a kneading process of the polyolefin resin to prepare the aggregated morphology of the island phase in an oriented non-spherical shape and the polyolefin is a crystallizable polyolefin resin.

9. The method for producing a rubber according to claim 7, wherein the step of softening is accomplished by a kneading process.

10. The method for producing a rubber according to claim 9, wherein the polyolefin is a crystallizable polyolefin resin.

11. The method of 7, further including treating the rubber to produce a green strength ranging from 188 to 406.

* * * * *